(No Model.)
G. W. WELLS.
BIFOCAL LENS FOR SPECTACLES AND EYEGLASSES.
No. 319,153.            Patented June 2, 1885.
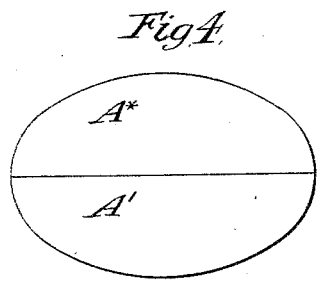
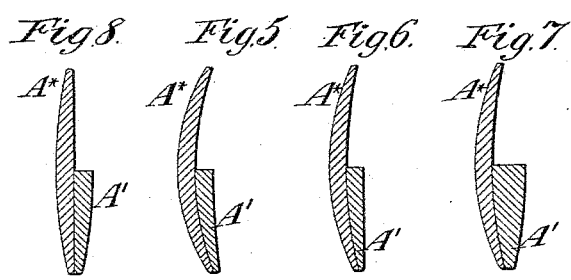
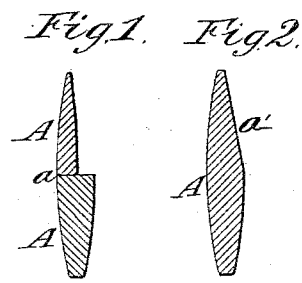
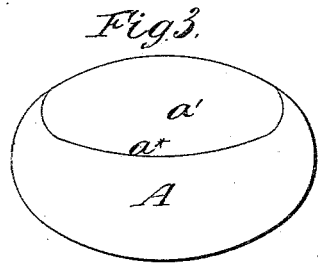
Witnesses
Henry Hay
Matthew Pollock
Inventor
George W. Wells
by his Attys
Brown & Hall

UNITED STATES PATENT OFFICE.

GEORGE W. WELLS, OF SOUTHBRIDGE, MASSACHUSETTS, ASSIGNOR TO THE AMERICAN OPTICAL COMPANY, OF SAME PLACE.

BIFOCAL LENS FOR SPECTACLES AND EYEGLASSES.

SPECIFICATION forming part of Letters Patent No. 319,153, dated June 2, 1885.

Application filed March 28, 1885. (No model.)

*To all whom it may concern:*

Be it known that I, GEORGE W. WELLS, of Southbridge, in the county of Worcester and State of Massachusetts, have invented a new and useful Improvement in Bifocal Lenses for Spectacles and Eyeglasses, of which the following is a specification.

The common way of making what is called a "split bifocal" lens is to take two half lenses of different powers and insert them in a frame, which holds them together. This is expensive, and it is difficult to fit the two halves as close as desirable, so that they will present a fine line only at their junction, and moreover, even if fitted ever so closely, the working of the frame and the knocks the lens receives when the spectacles or eyeglasses are laid down, cause the two half-lenses to chip or flake at their adjoining edges and so make a heavy line through the lens.

Another way of making what is called a "whole bifocal" lens is to take a double-convex or a periscopic-convex lens and grind it off on a plane from one edge to form a weaker focus at the upper portion of the lens. This is very objectionable and injurious to the eye, as it forms a prism on the upper part of the lens, which has the weaker focus. It also makes a restricted field of vision through the upper part of the lens, on account of the curve which forms the edge or boundary of the plane surface.

The object of my invention is to provide a bifocal lens which will obviate the objections above referred to due to the two methods of making hitherto practiced; and the invention consists in a bifocal lens for spectacles and eyeglasses, composed of a whole lens of the weaker power required for the upper portion of the glass, and a half-lens applied to the inner side thereof to give the lower half or portion of the glass the stronger power required.

In the accompanying drawings, Figures 1 and 2 are sectional views of bifocal lenses made in the two ways hereinabove described as old. Fig. 3 represents the inner side of a lens in which the upper portion is ground off on a plane. Fig. 4 represents the inner side of a lens embodying my improvement; and Figs. 5, 6, 7, and 8 are sectional views of lenses embodying my improvement, illustrating different ways in which such lenses may be formed.

Similar letters of reference designate corresponding parts in all the figures.

Referring first to Figs. 1, 2, and 3, which illustrate the old methods of making bifocal lenses, A A designate the upper and lower halves of the lens shown in Fig. 1. The upper half is of double-convex form to give the weaker power required, and the lower half is of double-convex form to give the stronger power required. These two halves are fitted carefully together at their adjacent edges and form a thin line, $a$, at their point of meeting. The working of the frame and the knocks to which such glass is subjected in laying down the spectacles or eyeglasses will cause the two pieces A A to chip or flake at their adjacent edges and on their outer sides, and the line $a$ will soon become thickened by use.

The lens represented in Figs. 2 and 3 is of double convex form, and afterward ground off to form a plane, $a'$, on its upper portion. The upper portion is thereby made to form a prism which is very injurious to the eye, and gives a restricted field of vision because of the curve $a^*$ which forms the boundary or margin of the plane $a'$.

In Figs. 4, 5, 6, 7, and 8, which illustrate my improved lens, $A^*$ designates the whole lens which forms the outer face of the glass, and $A'$ designates the half-lens which is applied to the inner side thereof to give the stronger power required in the lower part of the lens. In all the examples of my invention shown the lens is composed of these two parts.

In Fig. 5 the whole lens $A^*$ is periscopic convex, and the half-lens $A'$ applied to the inner side thereof is also periscopic convex. In Fig. 6 the whole lens $A^*$ is periscopic convex, and the half-lens $A'$ is plano-convex. In Fig. 7 the whole lens $A^*$ is periscopic convex and the half-lens $A'$ is double convex. In Fig. 8 the whole lens $A^*$ is plano-convex and the half-lens $A'$ is also plano-convex, the plane faces of the two being placed together.

For economy in manufacture I prefer the form shown in Fig. 8, because the expense of grinding the plano-convex glasses is less than that of other forms. The half-lens $A'$ and the whole lens A* may be cemented together by Canada balsam or other suitable transparent cement, such as is commonly used for uniting lenses.

By the addition of the half lens A' to the inner side of the whole lens A*, I obtain the higher power required for the lower half of the completed lens, and provide a lens in which the outer face, which is the only face likely to be struck or rubbed, is continuous without break or line.

My improved lens may be made at a less cost than the split bifocal lens shown in Fig. 1, and is not liable to chip or flake at any part as is the split lens, and it is more desirable and less injurious to the eye than the whole bifocal lens shown in Fig. 2, because the field of vision of its upper portion is less restricted and because its upper portion is not a prism.

What I claim as my invention, and desire to secure by Letters Patent, is—

1. The bifocal lens for spectacles and eye-glasses, herein described, consisting of a whole lens of the weaker power required for the upper portion of the completed lens, and a half-lens applied to the inner face of the whole lens to give the stronger power required in the lower portion of the completed lens, substantially as herein described.

2. The bifocal lens for spectacles and eye-glasses, herein described, consisting of a whole lens of plano-convex form and of the weaker power required for the upper portion of the completed lens, and a half-lens, also of plano-convex form, applied to the inner face of the whole lens to give the stronger power required for the lower portion of the completed lens, substantially as herein described.

GEORGE W. WELLS.

Witnesses:
ALBERT W. WELLS,
L. E. EMMONS.